United States Patent [19]

Arika et al.

[11] Patent Number: 4,554,211
[45] Date of Patent: Nov. 19, 1985

[54] SPHERICAL MICRO-POROUS SILICA GEL AND A PRODUCTION PROCESS THEREOF

[75] Inventors: Junji Arika, Tokuyama; Eiji Shiota, Shin-nanyo; Kazuaki Yamamoto, Tokuyama, all of Japan

[73] Assignee: Toyo Soda Manufacturing Co. Ltd., Yamaguchi, Japan

[21] Appl. No.: 519,496

[22] Filed: Aug. 2, 1983

[30] Foreign Application Priority Data

Aug. 4, 1982 [JP] Japan ................. 57-135210

[51] Int. Cl.$^4$ .............................................. C01B 33/16
[52] U.S. Cl. ................. 428/402; 252/313.2; 252/315.6; 252/315.7; 423/338
[58] Field of Search ............ 428/402; 252/317, 315.6, 252/313.2, 315.7; 423/338

[56] References Cited

U.S. PATENT DOCUMENTS

| | | | |
|---|---|---|---|
| 3,527,563 | 9/1970 | Shanklin | 423/338 |
| 3,634,288 | 4/1969 | Youngs | 106/308 Q |
| 3,855,172 | 12/1974 | Iler et al. | |
| 4,006,175 | 2/1977 | Termin et al. | 423/338 |
| 4,090,887 | 5/1978 | Marquisee et al. | 428/402 |
| 4,230,679 | 9/1980 | Mahler et al. | 423/338 |
| 4,302,364 | 11/1981 | Gosset et al. | 252/174.12 |
| 4,379,755 | 4/1983 | Yamada et al. | 252/314 |

FOREIGN PATENT DOCUMENTS 50-140397  11/1975  Japan.
53-17787   2/1978   Japan.

*Primary Examiner*—George F. Lesmes
*Assistant Examiner*—William M. Atkinson
*Attorney, Agent, or Firm*—Sherman & Shalloway

[57] ABSTRACT

A spherical micro-porous silica gel, which is characterized by having a mean diameter of 3–20 μm, a bulk density of 0.28–0.41 g/cm$^3$, a pore size of 18,000–100,000 and a specific surface area of 1,000–1,400 m$^2$/g and a production process therefor is characterized by employing (a) an aqueous solution containing SiO$_2$ in which the primary particle diameter is not larger than 6 nm and the molar ratio of SiO$_2$ to Na$_2$O is not larger than 5.5, (b) either stearic acid or a mixture of stearic acid and a non-ionic surface active agent of which HLB ranges from 3.5 to 6.0 as an emulsifier and (c) an organic acid as a gelling agent.

7 Claims, 2 Drawing Figures

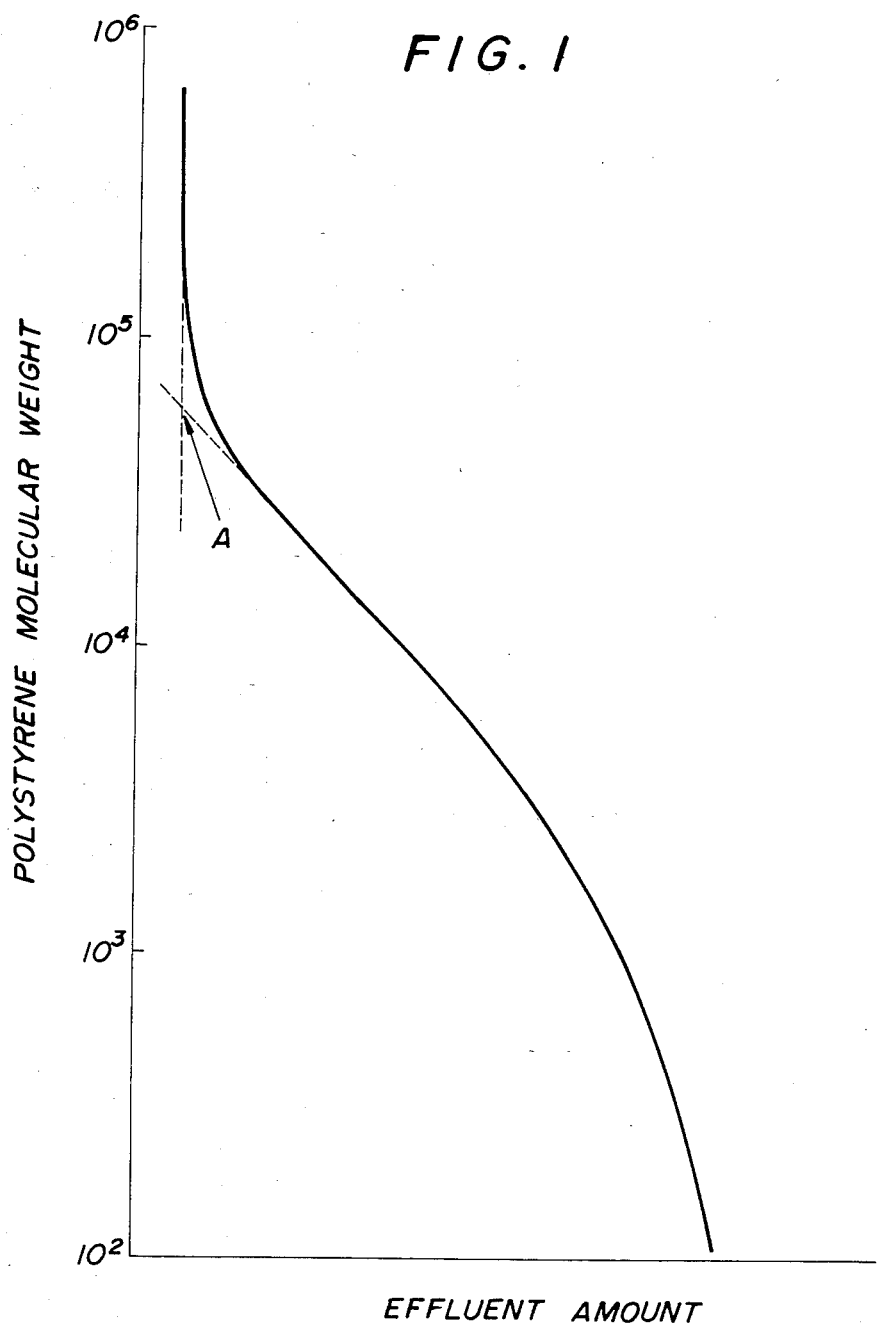

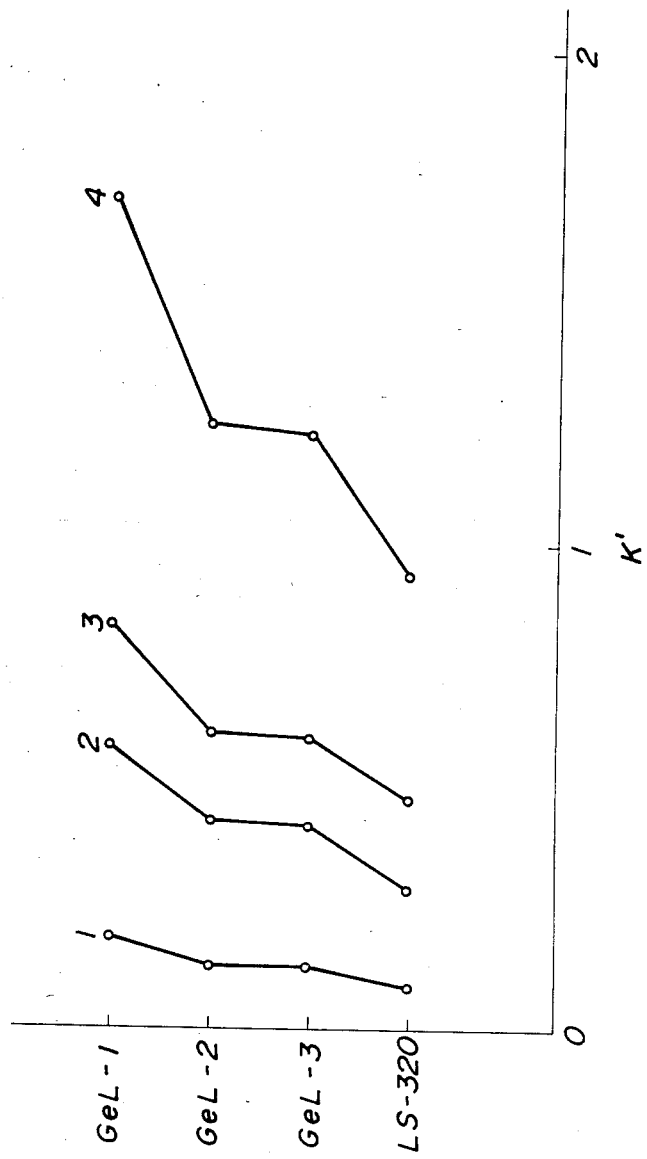

SPHERICAL MICRO-POROUS SILICA GEL AND A PRODUCTION PROCESS THEREOF

FIELD OF THE INVENTION

This invention relates to a spherical micro-porous silica gel and a production process therefor. More particularly, this invention pertains to an efficient spherical micro-porous silica gel especially useful as a support for liquid chromatography and a process for producing a spherical micro-porous slica gel having an extremely large specific surface area.

DESCRIPTION OF THE PRIOR ART

Silica gel is used as a packing material for the columns for gas or liquid chromatography and also as a support for catalysts in various contact reactions. In order to meet such diverse demands, a silica gel is required to have a given particle size, micro-porous structure and large specific surface area.

Among other things, when used as a carrier for high speed liquid chromatography, a silica gel has to satisfy many strict requirements. Briefly, the silica gel needs (1) to be of fine particle size of about 10 $\mu$m, (2) to be fully spherical in shape and uniform in size, (3) to have a certain pore size and specific surface area large enough to separate constituents present in the sample compounds and (4) to be of sufficient strength less likely to collapse or to be broken by movng layers which exert pressures or permeate into it.

Silica gels produced in conventional processes commonly have a specific surface area of only 200–500 $m^2/g$. For this reason, development of a new silica gel having much larger specific surface area, together with much higher retention capacity has been long awaited. Silica gels used for high speed liquid chromatography are currently produced through hydrolysis of organic silanes. But this process is disadvantageous because organic silanes are expensive and the process itself is very complex.

Additionally, it has been known that silica gels can be manufactured by causing sodium silicate or silica sol to form a gel while they are suspended as aqueous droplets in an oil phase. However, compared with the above process starting from organic silanes, the gelation process proved to be much more disadvantageous because the produced silica gel is mostly deformed and inferior in its capacity to chemically combine with other compounds.

SUMMARY OF THE INVENTION

Under the circumstances, to present inventors have studied intensively to eliminate drawbacks of such conventional process and finally succeeded in finding a spherical silica gel having very large specific surface area and establishing a process for producing the same with ease at low costs.

That is to say, the present invention provides a spherical micro-porous silica gel having a mean diameter of 3–20 $\mu$m, a bulk density of 0.28–0.41 $g/cm^3$, a pore size of 18,000–100,000, and a specific surface area of 1,000–1,400 $m^2/g$ and, in an improved process for producing silica gels through gelation of an aqueous solution containing $SiO_2$ which is dispersed in an oil phase as aqueous droplets, the production of a spherical micro-porous silica gel having a mean diameter of 3–20 $\mu$m, a bulk density of 0.28–0.41 $g/cm^3$, a pore size of 18,000–100,000, and a specific surface area of 1,000–1,400 $m^2/g$, which employs (a) an aqueous solution containing $SiO_2$ in which the primary particle diameter is not larger than 6 nm and the molar ratio of $SiO_2$ to $Na_2O$ is not larger than 5.5, (b) either stearic acid or a mixture of stearic acid and a non-ionic surface active agent of which HLB ranges from 3.5 to 6.0 as an emulsifier and (c) an organic acid as a gelling agent.

BRIEF DESCRIPTION OF THE DRAWINGS

FIG. 1 shows a typical calibration curve of polystyrene determined through liquid chromatography in which polystyrene molecular weight is plotted against its effluent amount in the logarithmic scale.

FIG. 2 shows comparative figures of k' which indicates retention capacity of each kind of the micro-porous silica gel against anisole (curve 1), nitrobenzene (curve 2), methyl benzoate (curve 3), and acetophenone (curve 4).

The silica gel pursuant to the first aspect of this invention is a fully spherical micro-porous gel particle which has a mean diameter of 3–20 $\mu$m, a bulk density of 0.28–0.41 $g/cm^3$, a pore size of 18,000–100,000, and a specific surface area of 1,000–1,400 $m^2/g$.

The term pore size (hereinafter abbreviated as PS), as the term is employed herein and in the appended claims, is specified by the PS value which represents a certain magnitude of polystyrene molecular weight, experessed by the point A, which is the intersection of two lines drawn tangentially to a calibration curve as shown in FIG. 1.

The calibration curve is a plot of effluent amount for a wide range of polystyrene resin samples of standardized (known) molecular weights versus the molecular weight of the polystyrene which is obtained with a liquid chromatography column 4 mm in diameter and 300 mm long and which is packed with the silica gel whose pore size (PS) is being determined.

The process for producing the silica gel according to the second aspect of this invention is a process which comprises preparing a water-in-oil type emulsion from an aqueous solution containing $SiO_2$ and an organic solvent, and producing fine particles through gelation of the emulsion by the addition of a gelling agent, whereby the size and shape of the emulsion particles are maintained as they stand. Preferably, in this process, an aqueous solution which contains $SiO_2$ is used as one of the starting materials and the primary particle in the aqueous solution should not be larger than 6 nm in diameter and the molar ratio of $SiO_2/Na_2O$ in the aqueous solution should not be larger than 5.5.

Commonly an aqueous solution containing $SiO_2$ includes primary silica particles of which the mean diameter extends from several nm to several tens nm or a soluble component. In this invention, however, if the size of the primary particle exceeds 6 nm, a silica gel having a specific surface area of 450 $m^2/g$ and over is difficult to produce; likewise, if the molar ratio of $SiO_2/Na_2O$ exceeds 5.5, a soluble component can no longer remain stable in the aqueous solution containing $SiO_2$. As a result, it becomes impossible to deposit the soluble component, and it is difficult to expect the production of a stronger silica gel with larger specific surface area. In this connection, other than the aqueous solution containing $SiO_2$, an aqueous solution containing silica sol and/or sodium silicate can also be used for the same purpose. The water-in-oil type emulsion of this invention is prepared by dispersing such aqueous solutions into an organic solvent which contains as an emulsifier stearic acid or a mixture of stearic acid and a non-ionic surface active agent whose hydrophilic-lipophilic balance (HLB) ranges from 3.5 to 6.0.

So far it has been believed that a stable water-in-oil type emulsion can be prepared by merely adding a non-ionic surface active agent whose HLB is in the range 3.5-6.0. However, with only such a non-ionic surface active agent, silica gel particles tend to aggregate upon their gelation. In addition, they tend to grow into such a deformed shape that their packing density falls in consequence. Therefore, in this invention, stearic acid is used alone or in combination with a non-ionic surface active agent to facilitate formation of a fully spherical silica gel practically without any aggregation or deformation by taking advantage of the fact that stearic acid has a strong affinity with silica.

The term non-ionic surface active agent, as the term is employed herein, refers to sorbitan mono-stearate, sorbitan mono-oleate, propylene-glycol mono-stearate and the like, all of which are familiar to those who are skilled in the art. However, sorbitan mono-stearate is the most preferred of all the compounds mentioned above.

Although the amount of the above emulsifier to use cannot be particularly specified, the emulsifier will bring about little effect in stabilizing the prepared emulsion if the amount is extremely small. Additionally, there will be a risk that the gel particles tend to cause aggregation upon their gelation. Conversely when the amount of the emulsifier exceeds a certain limit, the effect of the emulsifier will stay almost unchanged. From this point of view, the amount of the emulsifier is preferably in the range 0.5-1% by weight.

As for the organic solvents, many kinds of solvents may be used and actually there is practically no restriction for their use except that the solubility of the emulsifier in the solvent should be at at least 1% by weight. However, among the available solvents, aromatic hydrocarbons, such as benzene, toluene, xylene, ethyl benzene, etc., are particularly useful to achieve the objects of this invention.

Meanwhile, in this invention almost all common types of stirrers can be used without troubles to make up the emulsion. However, since ordinary paddled stirrers are sometimes ineffective in reducing the mean diameter of the emulsion particles to below 30 μm and with such type of stirrers the particle size distribution most likely becomes broad, it is considerably difficlt to produce a preponderance of silica gel particles having a desired size of about 10 μm. From this standpoint, in this invention the use of a homogenizer type stirrer is preferred.

The emulsion thus prepared is permitted to undergo gelation when a gelling agent is mixed into it. In this case, organic acids serve as the gelling agent. Briefly, such organic acids as formic acid, acetic acid, propionic acid and the like can be favorably used, but acetic acid anhydride is preferable for this aim in particular. In relation to this, according to this invention, it is also possible to vary the PS value by varying the rate is of adding the gelling agent.

Separation of the spherical fine particle from the produced slurry can be made by any conventional means. For example, the slurry containing the spherical silica gel is added to alcohol, after being kept standing for a little while, the supernatant alcohol solution is decanted and the remaining slurry is washed in an acid solution such as dilute sulphuric acid, etc., water, and alcohol in succession before the silica gel is dried up.

As described above, the silica gel having a large specific surface area and efficient capacity required for a support for high speed liquid chromatography can be produced easily at low costs.

The invention will be explained more concretely according to the following examples.

EXAMPLE 1

An oil phase was prepared by dissolving 1.08 g of sorbitan mono-stearate of HLB 4.7 and 1.08 g of stearic acid in about 250 ml of toluene. A homogenizer type stirrer commercially available under the tradename T.K. Auto Homo Mixer, manufactured by Tokushu Kiki Kōgyō Kabushiki Kaisha, was used to make up an emulsion. The stirrer was allowed to rotate at a rate of 6,000 r.p.m. and 80 ml of a silica sol having a primary particle size below 6 nm and a molar ratio of $SiO_2/Na_2O$ of 5, which is manufactured by Shokubai Kasei Kōgyō Kabushiki Kaisha under the tradename Cataloid SI-500, was added to the oil phase and stirred for about 16 minutes.

Thus, the silica sol turned to spherical fine particles of 5 to 20 μm diameter. After that, 10 ml of acetic acid anhydride was poured into the emulsion over about 30 seconds to cause gelation and the gel was kept standing overnight for ageing.

The silica gel slurry prepared in this way was dispersed in methanol and left to stand for a little while. After that, the toluene and the emulsifier previously added were removed by decanting the supernatant methanol solution.

Next, the silica gel slurry was rinsed with sulphuric acid of pH 2.5 until the pH of the slurry reached 2.5, and the so-treated slurry was then rinsed with pure water until the pH of the slurry became equal to that of the pure water. The pure water contained in the silica gel was dried overnight at 60° C. under a reduced pressure.

Table 1 shows the data on the physical properties of the silic gel (hereinafter referred to as Gel-1) obtained in this way. For comparison, the data on the physical properties of a slica gel used as a support for high speed liquid chromatography, which is produced by Toyo Soda Manufacturing Co., Ltd. under the commerical name LS-320, are also given in Table 1.

TABLE 1

| Data on the Physical Properties | Gel-1 | LS-320 |
| --- | --- | --- |
| Specific surface area (m²/g) | 1,379 | 500 |
| Pore size (PS) | 19,000 | 14,000–16,000 |
| Bulk density (g/cm³) | 0.41 | 0.51 |
| Shape | Spherical | Spherical |
| Mean diamter (μm) | 10 | 10 |
| Content of the particle having the size distribution 5–15 μm (% by weight) | 95 | — |

Remark 1: The specific surface area was determined by the BET method.
Remark 2: The particle size distribution was measured by means of a COLTER Counter.

EXAMPLE 2

A spherical micro-porous silica gel (hereinafter referred to as Gel-2) was produced quite similarly to the one in Example 1, except that the total amount of the acetic acid anhydride was poured into the emulsion over one hour. The data on the physical properties of the silica gel is shown in Table 2.

EXAMPLE 3

Sodium silicate (SiO$_2$ content: 13.9% by weight, Na$_2$O content: 4.2% by weight, Molar ratio of SiO$_2$/Na$_2$O 3.4) was emulsified in the same way as in Example 1. The emulsion was caused to gel by adding 10 ml of acetic acid anhydride over 45 seconds. After that, the gel was treated similarly to the one in Example 1 to produce a spherical micro-porous silica gel (hereinafter referred to as Gel-3). The data on its physical properties is given in Table 2.

TABLE 2

| Data on the Physical Properties | Gel-2 | Gel-3 |
| --- | --- | --- |
| Specific surface area (m$^2$/g) | 1,132 | 1,013 |
| Pore size (PS) | 60,000 | 100,000 |
| Bulk density (g/cm$^3$) | 0.32 | 0.28 |
| Shape | Spherical | Spherical |
| Mean diameter (μm) | 10 | 3–5 |

EXAMPLE 4

In order to study efficiency required for support for liquid chromatography, each kind of the spherical micro-porous silica gel obtained was packed into a 4 mmφ×300 mm column to compare their retention capacity against a mixture composed of toluene, anisole, nitrobenezene, methyl benzoate, and acetophenone. Hexane, which contains 0.5% of ethanol, was used as a moving phase.

The retention capacity was assessed with the capacity ratio k' which is expressed by the following equation:

$$k' = (V_R - V_O)/V_O$$

where $V_O$ stands for the effluent amount of toluene and $V_R$ stands for effluent amounts of other samples mentioned above.

As best seen from FIG. 2 each of the spherical micro-porous silica gels showed a retention capacity 1.2–1.7 times as much as the retention capacity of LS-320 with the increase of their specific surfaces area.

As described above, it is obvious that the silica gel produced according to this invention brings about an excellent capacity.

What we claim is:

1. A spherical micro-porous silica gel, which is characterized by having a mean diameter of 3–20 μm, a bulk density of 0.28–0.41 g/cm$^3$, a pore size of 18,000–100,000, and a specific surface area of 1,000–1,400 m$^2$/g.

2. The spherical microporous silica gel of claim 1 having a specific surface area of from about 1,013 m$^2$/g to 1,379 m$^2$/g.

3. In a process for producing silica gels through gelation of aqueous solution containing SiO$_2$ which is dispersed in an oil phase as aqueous droplets, the improvement for the production of a spherical micro-porous silica gel having a mean diameter of 3–20 μm, a bulk density of 0.28–0.41 g/cm$^3$, a pore size of 18,000–100,000, and a specific surface area of 1,000–1,400 m$^2$/g, which comprises employing (a) an aqueous solution containing SiO$_2$ in which the primary particle diameter is not larger than 6 nm and the molar ratio of SiO$_2$/Na$_2$O is not larger than 5.5, (b) either stearic acid or a mixture of stearic acid and a non-ionic surface active agent of which HLB ranges from 3.5 to 6.0 as an emulsifier and (c) an organic acid as a gelling agent.

4. A process for producing a spherical micro-porous silica gel according to claim 3, in which the aqueous solution containing SiO$_2$ is an aqueous solution which contains a silica sol, sodium silicate or a mixture thereof.

5. The process according to claim 3 wherein the emulsifier (b) consists essentially of stearic acid.

6. The process according to claim 3 wherein the emulsifier (b) consists essentially of the mixture of stearic acid and the non-ionic surface active agent.

7. The process according to claim 6 wherein the non-ionic surface active agent is sorbitan mono-stearate.

* * * * *